United States Patent [19]
Wight et al.

[11] Patent Number: 5,163,067
[45] Date of Patent: Nov. 10, 1992

[54] METHOD AND APPARATUS FOR DECODING MANCHESTER ENCODED DATA

[75] Inventors: Mark S. Wight, Ottawa; Mervin Doda, Nepean, both of Canada

[73] Assignee: Northern Telecom Limited, Montreal, Canada

[21] Appl. No.: 795,446

[22] Filed: Nov. 21, 1991

[51] Int. Cl.$^5$ .............................................. H04L 27/22
[52] U.S. Cl. .......................................... 375/87; 341/70; 360/44
[58] Field of Search .................. 375/55, 84, 87, 95, 375/110, 119; 360/40, 43, 44; 341/70

[56] References Cited

U.S. PATENT DOCUMENTS

| | | | |
|---|---|---|---|
| 4,317,211 | 2/1982 | Quesnell, Jr. | 375/87 |
| 4,361,895 | 11/1982 | Khoudari | 375/87 |
| 4,688,232 | 8/1987 | Fox | 375/87 |

Primary Examiner—Stephen Chin
Attorney, Agent, or Firm—Dallas F. Smith

[57] ABSTRACT

A receiver for Manchester encoded data includes an autocalibration feedback loop that generates a timing pulse used to recover the clock and data signals. The autocalibration feedback loop includes a first digital delay line sampled by a plurality of D-type flip-flops in dependence upon the recovered clock signal to produce a control word CNT(O:N) indicative of the number of digital delay elements required to approximate one-half of the recovered clock period. A second digital delay line, connectivity mapped to the first, provides three-eighths of a clock period delay. The delayed clock signal is derived from the bit stream by sampling in dependence upon the timing pulse. The decoded data signal is derived from the bit stream by multiplexing the sampling input in dependence upon the timing pulse and the decoded data signal.

10 Claims, 5 Drawing Sheets

| i0 | i1 | sel | output |
|----|----|-----|--------|
| 0  | 0  | X   | 0      |
| 1  | 1  | X   | 1      |
| i0 | X  | 0   | i0     |
| X  | i1 | 1   | i1     | output = i0 *i1 + sel * i0 + sel * i1

METHOD AND APPARATUS FOR DECODING MANCHESTER ENCODED DATA

This invention relates to a method and apparatus for decoding Manchester encoded digital data signals and is particularly concerned with providing autocalibration.

It is well known to use Manchester encoding of binary data for example for transmission of data. In Manchester encoding, a data '1' is represented by the two-bit word 10, and a data '0' is represented by the opposite two bit word 01. The transmitted bit rated is thus twice the data rate. Advantages of Manchester encoding include a high signal transmission density (changes between '0' and '1' bits), a null d.c. component in the transmitted signal spectrum, and the ability to detect data errors as sequence violations (e.g., the two-bit words 00 and 11 represent errors rather than valid data).

In decoding Manchester data, it is necessary for the decoder to be synchronized to the two-bit word boundaries (also known as the active edges). For example, a series of data '1's is encoded as a bit sequence . . . 1010101010 . . . ; if the decoder is out of phase with the word boundaries, this will be incorrectly interpreted as a series of data '0's, i.e., the bit sequence . . . 01010101 . . .

A number of techniques are known for decoding a Manchester coded digital data signal. One technique uses a digital phase lock loop (PLL) which locks to the active edge of the receive signal. Another technique uses a differentiator followed by a tuned resonant filter to recover the bit rate clock. The receive bit stream is clocked by the bit rate clock and the receive data is decoded using any of a number of known methods.

With the increasing popularity of programmable logic arrays for the implementation of fully digital circuits and digital circuits generally, it is desirable to provide a fully digital Manchester data receiver. It is also desirable to provide a receiver with autocalibration to transmitter clock frequency and to compensate for variations in clock phase and frequency caused by operating conditions. For example, silicon CMOS integrated circuits introduce wide time differences or deltas between their best case propagation delays and their worst case propagation delays. The deltas are primarily due to operating temperature variation, supply voltage variation and chip processing variation.

SUMMARY OF THE INVENTION

An object of the present invention is to provide an improved circuit for receiving Manchester coded digital data signals.

In accordance with an aspect of the present invention there is provided a method of decoding data represented by a bit stream in which 10 and 01 bit sequences represent data bits, comprising the steps of: producing a clock signal with a period corresponding to twice the duration of each data bit and having a falling edge delayed by a holding time from a falling edge of the bit stream; producing a timing pulse having a falling edge defined by the falling edge of the clock signal; and producing decoded data from the bit stream in dependence upon the timing pulse.

Preferably, the step of producing a timing pulse includes the steps of determining a first number of digital delay elements required to approximate one-half of the clock signal period, a second number of digital delay elements, for delaying the clock signal an amount corresponding to about three quarters of the first number and exclusive NORing the clock signal with the delayed clock signal to produce the timing pulse.

In accordance with another aspect of the present invention there is provided apparatus for decoding data represented by a bit stream in which 10 and 01 bit sequences represent data bits, comprising: first means for producing a clock signal with a period corresponding to twice the duration of each data bit and having a falling edge delayed by a holding time from a falling edge of the bit stream; second means for producing a timing pulse having a falling edge defined by the falling edge of the clock signal; and third means producing decoded data from the bit stream in dependence upon the timing pulse.

Preferably, the second means includes first digital delay means for determining a first number of digital delay elements required to approximate one-half of the clock signal period, second digital delay means for providing, a second number of digital delay elements, for delaying the clock signal an amount corresponding to about three quarters of the first number and means for exclusive NORing the clock signal with the delayed clock signal to produce the timing pulse.

In an embodiment of the present invention the first digital delay means includes a plurality of series connected digital delay elements for providing a plurality of delayed clock signals and a plurality of D-type flip-flops for sampling the plurality of delayed clock signals to produce a control word indicative of the second number of digital delay elements.

In a further embodiment of the present invention the second digital delay means includes a plurality of series connected digital delay multiplexers, with redundant decoding, for delaying the clock signal in dependence upon the control word.

The Manchester data receiving apparatus of the present invention has several advantages. The embodiments of the present invention are fully digital which allows testing by digital test facilities. The redundant decoding in the mutliplexers and the control word format ensure that the presence of metastable signals in the calibration feedback loop do not adversely affect the operation of the Manchester data receiver. The present invention autocalibrates to the frequency of the receive data. The autocalibration feature also compensates for variations in supply voltage, temperature and propagation delay.

BRIEF DESCRIPTION OF THE DRAWINGS

The present invention will be further understood from the following description with reference to the drawings in which.

DESCRIPTION OF THE PREFERRED EMBODIMENTS

Figure 1:
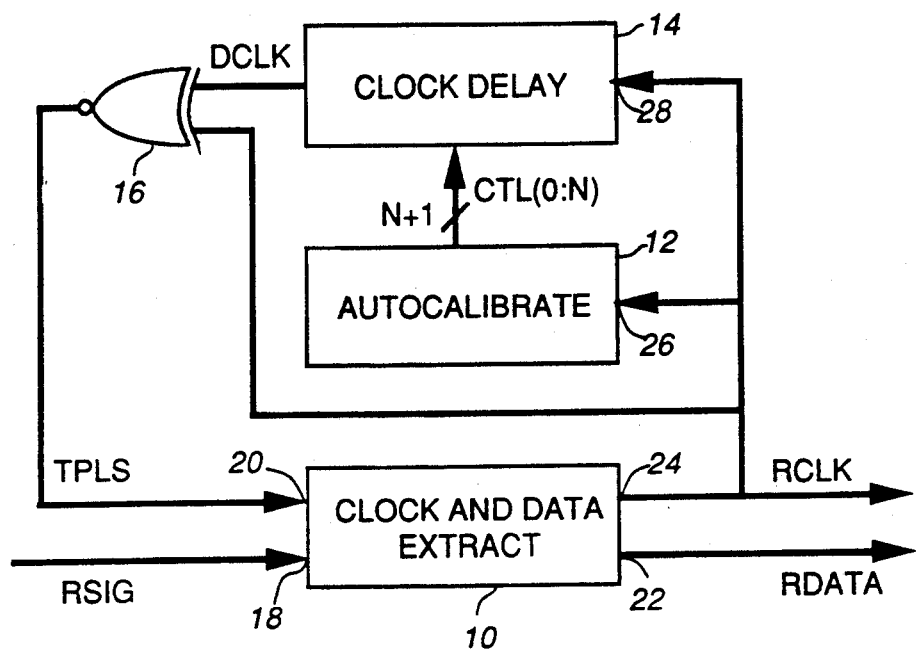
FIG. 1 illustrates in a block diagram a Manchester coded data receiver in accordance with an embodiment of the present invention.

Referring to FIG. 1, there is illustrated in a block diagram a Manchester coded data receiver in accordance with an embodiment of the present invention. The Manchester coded data receiver comprises clock and data extraction block 10, an autocalibration block 12, a clock delay block 14, and an exclusive NOR gate 16. The clock and data extraction block 10 includes inputs 18 and 20 for receiving as input a Manchester coded digital data stream RSIG and a timing pulse TPLS, respectively. The clock and data extraction block 10 also includes outputs 22 and 24 for outputting extracted data RDATA and a divide-by-two clock RCLK, respectively. The output 24 is connected to clock inputs 26, 28, and 30 of the autocalibration block 12, the clock delay block 14, and the exclusive NOR gate 16, respectively. The autocalibration block 12 includes an output 32 for providing an n+1 bit control word CTL (0:N). The clock delay block 14 includes an input 34 for receiving the control word CTL(0:N) from the autocalibration block 12 and an output 36 for a delayed clock signal DCLK. The exclusive NOR gate 16 includes an input 38 connected to the output 36 of the clock delay block 14 and an output 40 connected to the input 20 of the clock and data extraction block 10.

Figure 2:
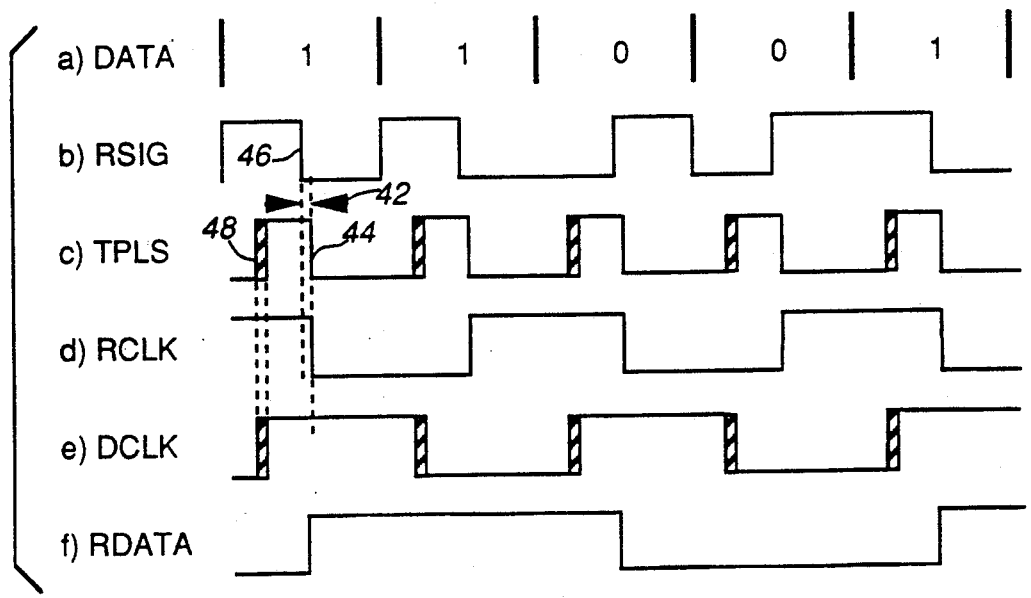
FIG. 2 graphically illustrates a timing diagram for signals in the embodiment of FIG. 1.

Referring to FIG. 2, there is graphically illustrated a timing diagram for the signals of FIG. 1. In FIG. 2, line a) represents a sample of data being transmitted. Line b) represents the Manchester encoded data signal RSIG for the sample and received at the input 18 of clock and data extraction block 10. Line c) represents the timing pulse output from the exclusive NOR gate 16. Line d) represents the divide-by-two clock RCLK. Line e) represents the delayed clock signal DCLK output from the clock delay block 14. Line f) represents the received data signal RDATA in NRZ form at the output 22 of clock and data extraction block 10.

In operation, the data and clock extraction block 10 uses the timing pulse TPLS to identify the active edge on the Manchester coded digital data stream RSIG and generates the extracted data RDATA and the divide-by-two clock RCLK. The autocalibration block 12 uses RCLK to measure the number of gate delays per one-half RCLK clock cycle. The autocalibration block 12 then generates the control word CTL(0:N) representative of the number of gate delays. The clock delay block 14 uses a 1 to $\frac{3}{4}$ mapping of the control word CTL(0:N) to determine the number of gate delays required to delay RCLK $\frac{3}{4}$ of a clock cycle to generate the delayed clock signal DCLK. The delayed clock signal DCLK is then applied as input with the divide by two clock signal RCLK to the exclusive NOR gate 16 to generate the timing pulse TPLS. Delays within the clock and data extraction block 10 provide a hold time 42 that ensures that the timing pulse TPLS falling edge 44 follows the RSIG falling edge 46. The clock and data extraction block 10 creates similar delays in generating the received data signal RDATA. Hence, the divide-by two clock signal RCLK and the received data signal RDATA are substantially aligned. A hachured area 48 at the leading edge of TPLS indicates an uncertainty region in which TPLS (and therefore DCLK) could be a metastable signal level. Thus, there is uncertainty in both the timing of the leading edge and the voltage level of the signal. This uncertainty is duplicated in both edges of the delayed clock signal DCLK. The origin of this uncertainty is described hereinbelow in connection with the operation of the clock delay block of FIG. 5.

Figure 3:
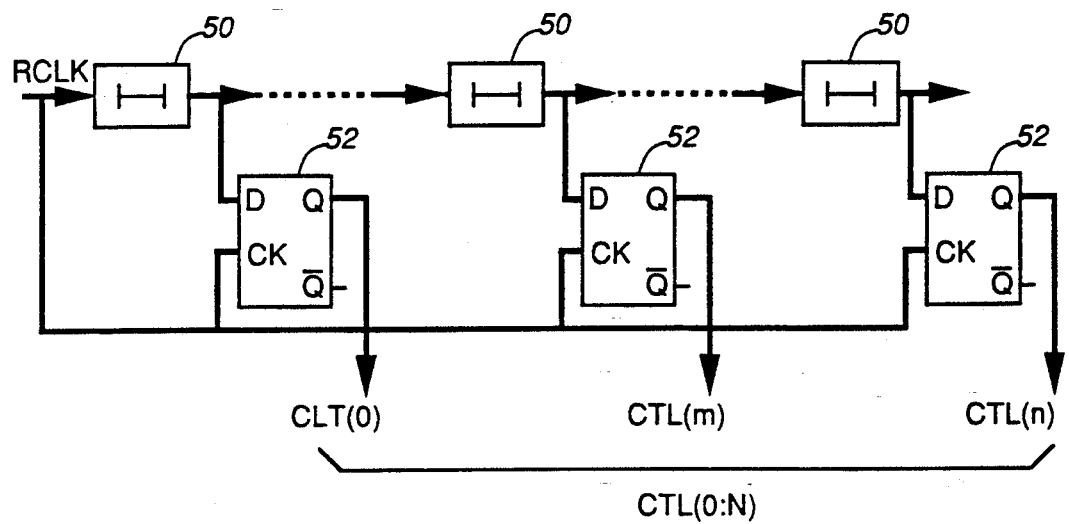
FIG. 3 illustrates, in a block diagram, details of the autocalibration block of FIG. 1.

Referring to FIG. 3, there is illustrated, in a block diagram, details of the autocalibration block of FIG. 1. The autocalibration block 12 comprises a delay line formed from a plurality of digital delay elements 50 connected in series, and a parallel register formed from a plurality of D-type flip-flops 52.

Figure 4:
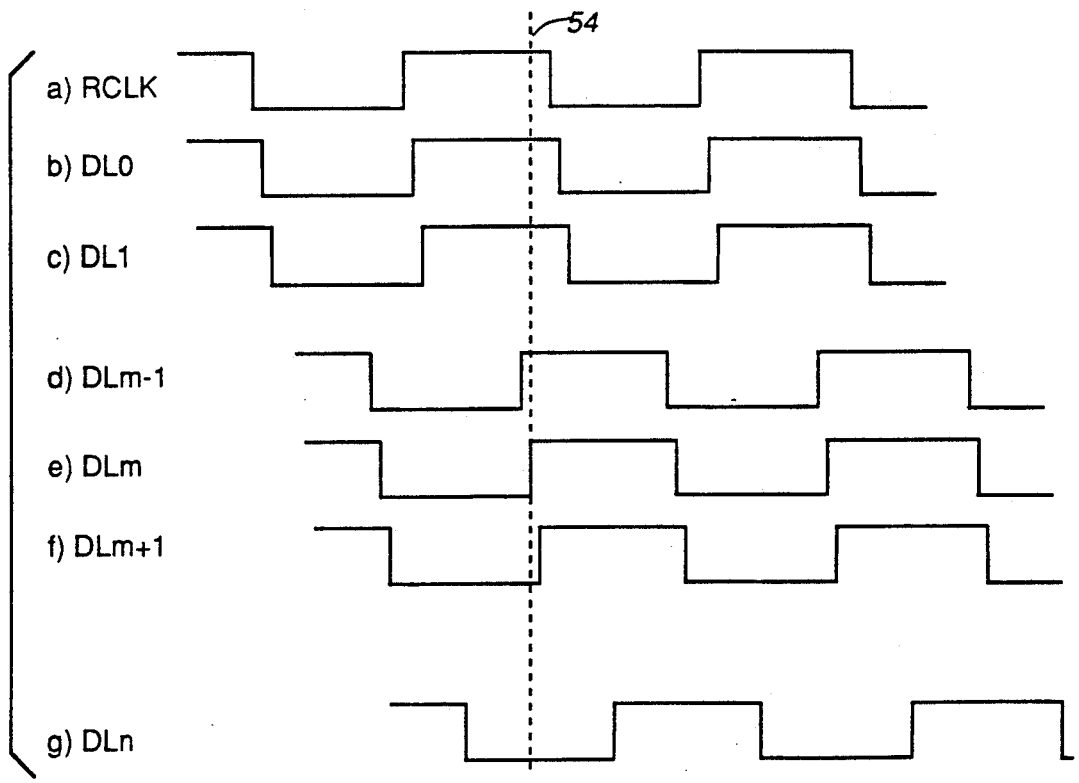
FIG. 4 graphically illustrates a timing diagram for the signals of the autocalibration block of FIG. 3.

Referring to FIG. 4, there is graphically illustrated a timing diagram for the signals of FIG. 3. In FIG. 4, line a) represents the divide-by-two clock RCLK. Line b) represents a delayed clock signal DL0 produced from RCLK by the delay through one digital delay element 50. Line c) represents a delayed clock signal DL1 produced from RCLK by the delay through two digital delay elements 50. Line d) represents a delayed clock signal DLm-1 produced from RCLK by the delay through m digital delay elements 50. Line e) represents a delayed clock signal DLm produced from RCLK by the delay through m+1 digital delay elements 50. Line f) represents a delayed clock signal DLm+1 produced from RCLK by the delay through m+2 digital delay elements 50. Line g) represents a delayed clock signal DLn produced from RCLK by the delay through n+1 digital delay elements 50. A broken line 54 indicates a falling edge of the RCLK signal relative to the delayed clock signals DL0, DL1, ..., DLn. Operation of the autocalibration block of FIG. 3 is described in connection with the timing diagram of FIG. 4.

In operation, the divide-by two clock RCLK is applied as input to the first of the plurality of digital delay elements 50 and to the clock inputs of the plurality of D-type flip-flops 50. The plurality of digital delay elements 50 provide n+1 delayed clock signals, DL0, DL1, ..., DLn, from the RCLK signal, where n is an integer. The plurality of D-type flip-flops 52 are clocked by the RCLK signal, each to sample a respective one of the delayed clock signals DL0, DL1, ..., DLn to provide a plurality of control signals CTL(0), ..., CTL(n). Thus, the parallel register formed from a plurality of D-type flip-flops 52 stores the control word CTL(0:N). The control word CTL(0:N) formed from the control signals CTL(0) through CTL(n) by the plurality of D-type flip-flops, is indicated by the broken line 54 in FIG. 4. For some intermediate flip-flop m, that is the (m+1) the flip-flop 52, the it is a disallowed state X rather than '0' or '1'. The resultant control word CTL(0:N) equals (00 ... 0x1 ... 1), where CTL(m)=X. The delay spacing provided by the digital delay elements 50 is selected to ensure that only a single consecutive bit in the control word CTL(0:N) equals X. In the event that variations in process, temperature and voltage combine to create a worst case with minimum delays, more than one intermediate flip-flop may have a CTL bit equal to X or the control word may consist of '0's followed by '1's followed by zeros. For example the control word CTL(0:N) may equal (00 ... 0X11 ... 111X000 ... 000), (00 ... 0X11 ... 111000 ... 000), or (00 ... 011 ... 111000 ... 000). The rollover of the most significant bits of CTL(0:N) into the next set of zeros has no effect on the operation of the clock delay block described below.

Figure 5:
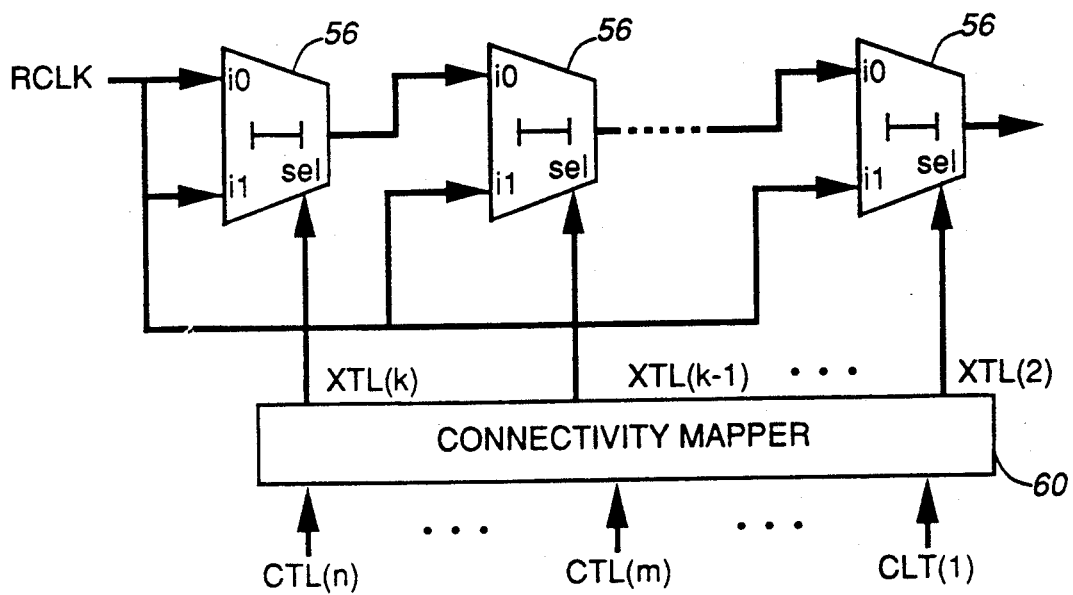
FIG. 5 illustrates details of the clock delay block of FIG. 1.

Referring to FIG. 5, there is illustrated details of the clock delay block of FIG. 1. The clock delay block 14 comprises a plurality of digital delay multiplexer elements 56 connected in series, each element containing redundant decoding. The redundant decoding in each digital delay multiplexer element 56 ensures that the effect of an X in CTL(0:N) is limited to an uncertainty of one delay element in the DCLK signal, independent of the phase alignment of the control word updating. The potential propagation of the metastable state is confined to a region (hachured area in FIG. 2) at the edges of the DCLK signal. The delay through the digital delay multiplexer element 56 is equal to the delay through the digital delay element 50 in the autocalibration block 12. The clock delay block 14 further comprises a connectivity mapper 60 having n inputs for control signals CTL(1) through CTL(n) and k−1 outputs select signals XTL(2) through XTL(k). The connectivity mapper 60 maps CTL(1:N) to XTL(2:k) in accordance with the following:

XTL(i)←CTL(j)

where j=i*4/3 rounded off to a positive integer. Thus, the M−1 least significant '0's of CTL are mapped to (M−1)*¾ '0's in XTL. Only k−1 elements of CTL are used. A delay of ½ of a RCLK cycle is mapped into a delay of ⅜ of a RCLK cycle.

A '0' at the SEL input of the delay multiplexer selects the output of the previous stage. A 1 at the SEL input of the delay multiplexer selects RCLK. When XTL(2:P) equals 00...00 and XTL(P+1:K) equals 11 ...1 then RCLK is delayed by P delay units to generate DCLK. If instead XTL(P+1:K) equals X11...1 the RCLK is delayed by somewhere between P and P+1 delay units to generate DCLK. The effect of a single X in the control signal CTL is indicated by the hachured area on both edges of DCLK and the rising edge of TPLS in FIG. 2. Within the hachured area DCLK could be metastable, hence DCLK is not a valid clock signal.

Figure 6:
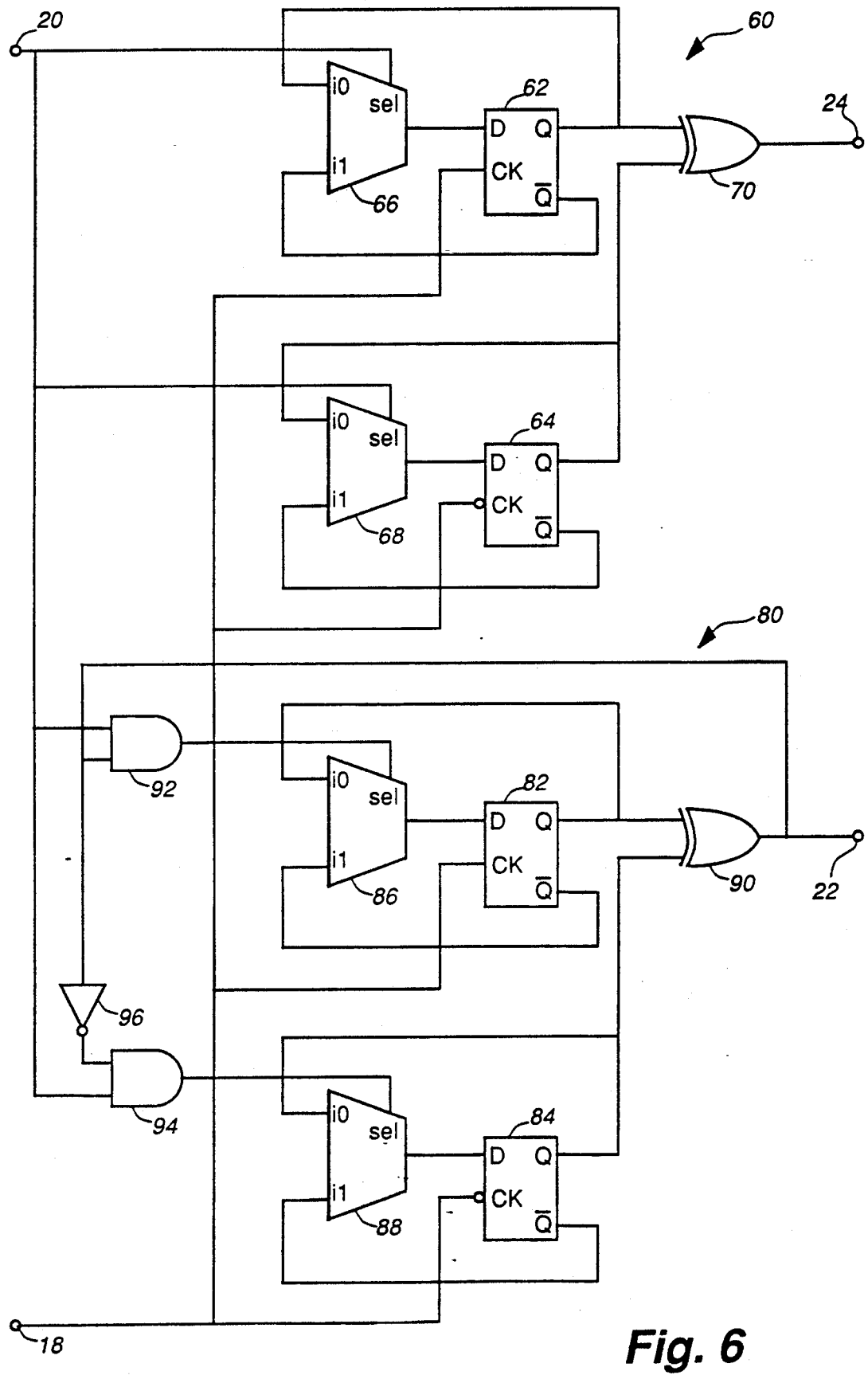
FIG. 6 illustrates a logic symbol circuit diagram of the clock and data extraction block of FIG. 1.

Referring to FIG. 6 there is illustrated a logic symbol circuit diagram for the clock and data extraction block of FIG. 1. The clock and data extraction block comprises a clock extract block 60 and a data extract block 80. The clock extract block 60 includes D-type flip-flops 62 and 64, digital delay multiplexers 66 and 68 and an exclusive OR gate 70 interconnected as shown in FIG. 6. The D-type flip-flops 62 and 64 are clocked by the Manchester coded data signal RSIG applied to the input 18. The D-type flip-flop 62 is positive edge triggered while the D-type flip-flop 64 is negative edge triggered. The timing pulse TPLS is applied as input to the input 20 connected to the select inputs of the digital delay multiplexers 66 and 68.

The data extract block 80 includes a similar arrangement with D-type flip-flops 82 and 84, digital delay multiplexers 86 and 88 and an exclusive OR gate 90, and in addition AND gates 92 and 94 and inverter 96, interconnected as shown in FIG. 6. The D-type flip-flops 82 and 84 are clocked by the Manchester coded data signal RSIG applied to the input 18. The D-type flip-flop 82 is positive edge triggered while the D-type flip-flop 84 is negative edge triggered. The timing pulse TPLS is applied as input to AND gates 92 and 94, together with RDATA and inverted RDATA, respectively. Output of AND gates 92 and 94 are connected to the select inputs of the digital delay multiplexers 66 and 68, respectively.

In operation, for the clock extract block 60, when the timing pulse TPLS is high, either the positive or negative edge triggered flip-flops 62 and 64 toggles. Since the outputs of D-type flip-flops 62 and 64 are XORed to produce RCLK, RCLK changes state for each occurrence of a '1' in the timing pulse TPLS. The edges which define RCLK experience propagation delays through either D-type flip-flop 62 and XOR gate 70 or D-type flip-flop 64 and XOR gate 70. Thus, the edges of RCLK, output by XOR gate 70 are delayed with respect to the active edge of RSIG by an amount equal to the propagation delays. Since the edges of RCLK define the negative edge of TPLS, the delay between RSIG and RCLK provides the hold time 42 described hereinabove in connection with FIG. 2.

In operation, for the data extract block 80, when the timing pulse TPLS is high and the RDATA signal is high the positive edge triggered flip-flop 82 toggles. When the timing pulse TPLS is high and the RDATA signal is low the negative edge triggered flip-flop 84 toggles. The outputs of D-type flip-flops 82 and 84 are then XORed to produce RCLK, RCLK changes state for each change in direction of the active edge of RSIG that coincides with the occurrence of a '1' in the timing pulse TPLS.

It is possible for the clock and data extraction circuit to become locked to the interdigital edge of RSIG rather than the active edge. However, the first missing interdigital edge in RSIG caused by a '1 to 0' or '0 to 1' transition in the original data would cause the TPLS signal to wait for the next edge, in this case the active edge, to lock onto RSIG.

If the range of delay provided by the clock delay block 14 encompasses a full RCLK period, it is possible for a false lock to one-half the desired frequency to occur. Additional circuitry is required to prevent the false lock. For example a version of a lock control circuit includes positive and negative edge triggered flip-flops to force the clock and data extract blocks 60 and 80 to toggle if the previous edge of the RSIG signal was not concurrent with a TPLS pulse. Enhancements of the lock control circuit could include debounce and filter circuits to provide greater noise immunity as is well known in the art.

FIGS. 7a–d illustrate logic symbol circuit embodiments of the digital delay blocks of FIGS. 3 and 5.

Figure 7A:
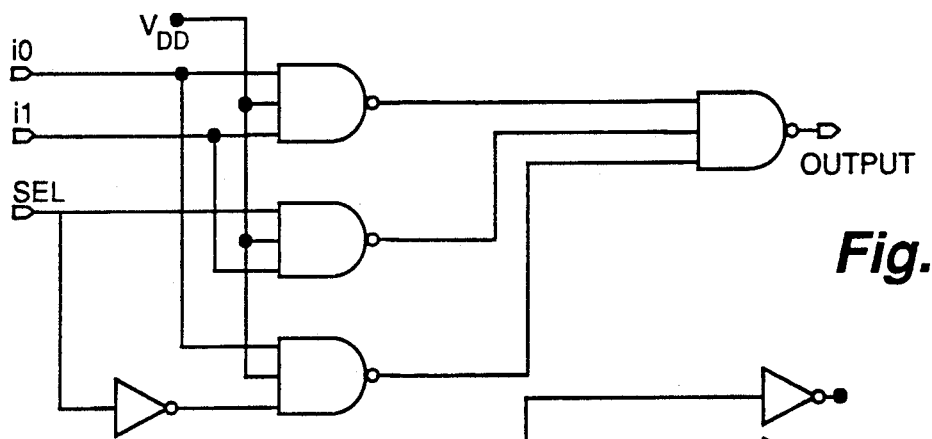
FIGS. 7A–7D illustrate logic symbol circuit embodiments of the digital delay blocks of FIGS. 3 and 5.
Figure 7C:
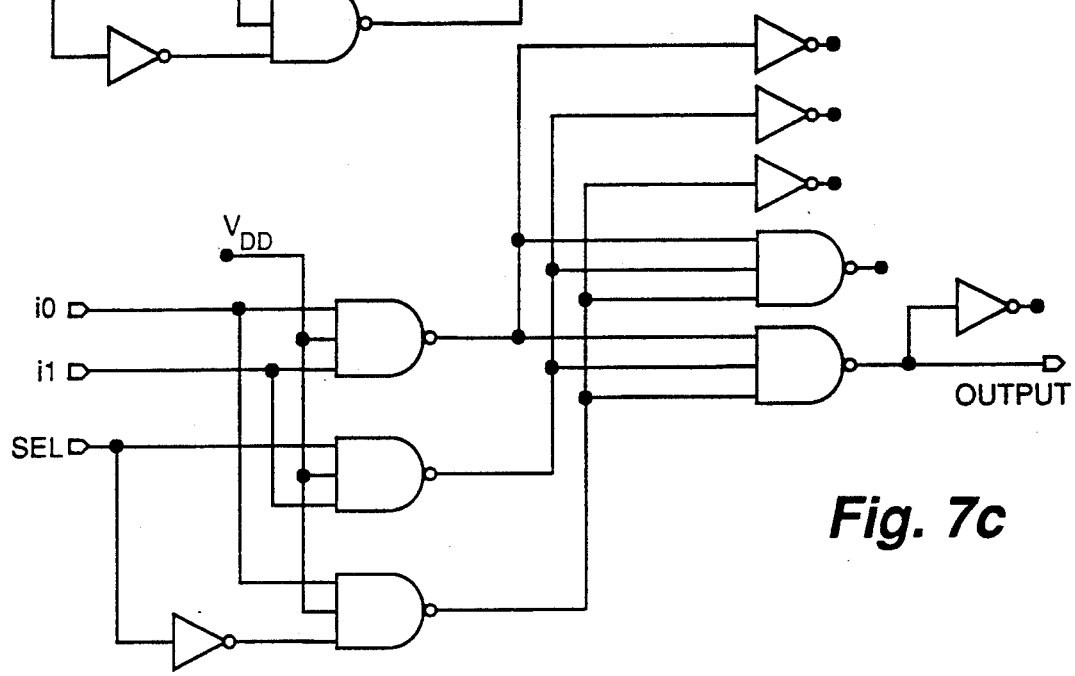
Figure 7B:
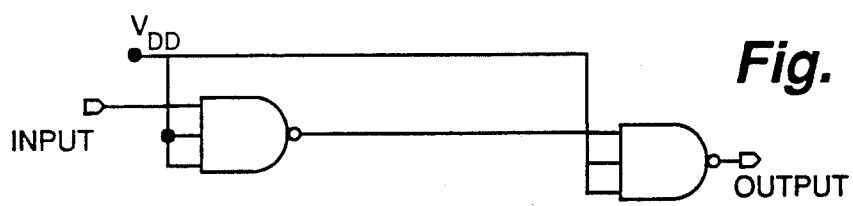
Figure 7D:
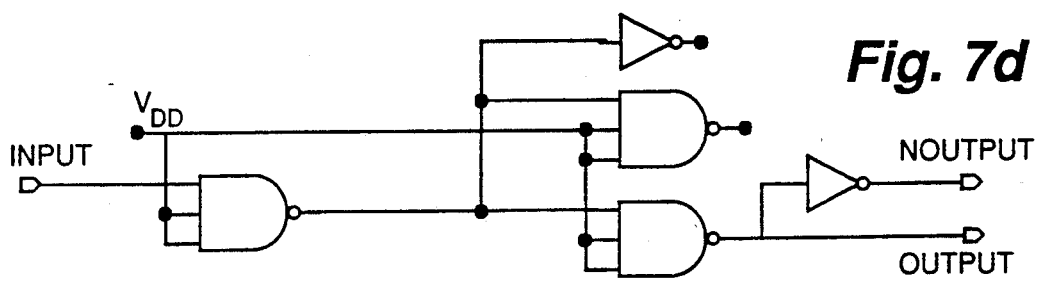

FIGS. 7a and 7b show NAND gate embodiments of delay multiplexer (56, 66 68, 86, and 88) and delay element 50, respectively. FIGS. 7c and 7d show further embodiments of delay multiplexer (56, 66 68, 86, and 88) and delay element 50, respectively. The embodiments of FIGS. 7c and 7d provide load balancing and buffer isolation. FIGS. 7a and (56, 66 68, 86, and 88) which prevents a metastable input signal, X, at the select input from propagating through to the output.

The Manchester data receiving apparatus of the present invention has several advantages. The embodiments of the present invention are fully digital which allows testing by digital test facilities. The presence of metastable signals in the calibration feedback loop do not adversely affect the operation of the Manchester data receiver. The present invention autocalibrates to the frequency of the receive data. The autocalibration feature also compensates for variations in supply voltage, temperature and propagation delay.

Numerous modifications, variations and adaptations may be made to the particular embodiment of the invention described above without departing from the scope of the invention, which is defined in the claims.

What is claimed is:

1. A method of decoding data represented by a bit stream in which 10 and 01 bit sequences represent data bits, comprising the steps of:

producing a clock signal with a period corresponding to twice the duration of each data bit and having a falling edge delayed by a holding time from a falling edge of the bit stream;

producing a timing pulse having a falling edge defined by the falling edge of the clock signal; and producing decoded data from the bit stream in dependence upon the timing pulse.

2. A method as claimed in claim 1 wherein the step of producing a timing pulse includes the steps of determining a first number of digital delay elements required to approximate one-half of the clock signal period, a second number of digital delay elements, for delaying the clock signal an amount corresponding to about three quarters of the first number and exclusive NORing the clock signal with the delayed clock signal to produce the timing pulse.

3. Apparatus for decoding data represented by a bit stream in which 10 and 01 bit sequences represent data bits, comprising:

first means for producing a clock signal with a period corresponding to twice the duration of each data bit and having a falling edge delayed by a holding time from a falling edge of the bit stream;

second means for producing a timing pulse having a falling edge defined by the falling edge of the clock signal; and third means producing decoded data from the bit stream in dependence upon the timing pulse.

4. Apparatus as claimed in claim 3 wherein the second means includes first digital delay means for determining a first number of digital delay elements required to approximate one-half of the clock signal period, second digital delay means for providing, a second number of digital delay elements, for delaying the clock signal an amount corresponding to about three quarters of the first number and means for exclusive NORing the clock signal with the delayed clock signal to produce the timing pulse.

5. Apparatus as claimed in claim 4 wherein first digital delay means includes a plurality of series connected digital delay elements for providing a plurality of delayed clock signals and a plurality of D-type flip flops for sampling the plurality of delayed clock signals to produce a control word indicative of the second number of digital delay elements.

6. Apparatus as claimed in claim 5 wherein second digital delay means includes a plurality of series connected digital delay multiplexers for delaying the clock signal in dependence upon the control word.

7. Apparatus as claimed in claim 6 wherein second digital delay means includes connectivity means for mapping the control word to a set of control bits for selecting signals input to the digital delay mutliplexers.

8. Apparatus as claimed in claim 7 wherein connectivity means maps control signals CTL(1), CTL(2), ... , CTL(n) to select signals CTL(2), ... XTL(k) in accordance with the following:

$$XTL(i) \leftarrow CTL(j)$$

where j=i*4/3 rounded off to a positive integer.

9. Apparatus as claimed in claim 8 wherein the digital delay multiplexers include redundant decoding for preventing a metastable signal at an input from being propagated to an output.

10. Apparatus as claimed in claim 9 wherein the digital delay output is given by:

$$output = i0*i1 + sel*i0 + sel*i1,$$

where, i0 and i1 are the input signals to the multiplexer, and sel is the select input to the multiplexer.

* * * * *